Patented Sept. 3, 1929.

1,726,851

UNITED STATES PATENT OFFICE.

EARL H. McLEOD, OF RUTHERFORD, NEW JERSEY, ASSIGNOR TO THE AULT & WIBORG COMPANY OF NEW YORK, OF NEW YORK, N. Y., A CORPORATION OF NEW YORK.

METHOD OF MAKING INORGANIC OXIDES.

No Drawing.   Application filed October 26, 1922.   Serial No. 597,181.

This invention relates to the production of iron oxide pigments of various shades and has for its principal objects the economical and expeditious production of the same in such a manner as to render them especially desirable for use either in printing-inks or paints, or for such other purposes as the characteristics of such pigment render the same particularly suitable.

It has long been known that soluble ferrous compounds, either freshly precipitated in the form of hydroxide or in the form of oxide produced by the ordinary roasting operation, could be converted, by partial oxidation, into oxides of varying shades and compositions. However, the oxidation of such soluble compounds is difficult to control, with the consequence that it is almost impossible to obtain successive batches of similar color and strength. My investigations have led to the discovery that it is possible to obtain pigments of high tinctorial strength, of various shades and of extremely uniform character and composition thru my hereinafter described method wherein the oxidizing action is accomplished while the iron salts are yet in a soluble condition.

In carrying out my improved method I preferably proceed as follows:

Forty (40) parts copperas ($FeSO_4 \cdot 7H_2O$) is dissolved in one hundred (100) parts of water and to the resultant solution is then slowly added, while cold, a bleaching solution prepared by dissolving thirteen (13) parts of bleaching powder ($CaOCl_2$) in two hundred (200) parts of water. The addition of the foregoing quantity of ordinary standard bleaching powder of about thirty-five per cent. (35%) chlorine content should be sufficient to entirely oxidize the ferrous salt but before the cessation of the addition of the bleach solution, the mixture to be oxidized is tested to make certain that all of the ferrous salt has been oxidized to the ferric state. When by test it appears that such oxidation is complete, a solution of eighteen (18) parts of soda ash ($Na_2CO_3$) in one hundred and five (105) parts of water is added to the solution, while still cold, in order to effect the precipitation of ferric hydroxide and calcium sulphate. Prior to the addition of the soda ash a decided cloudiness will be observed in the mixture but this is due principally to the calcium sulphate precipitated from the bleaching powder and not to precipitated iron hydroxide.

Following the addition of the sodium carbonate, the temperature of the solution is raised to a point sufficient to drive off excess chlorine, preferably about 180° F., and the heating is continued until all traces of chlorine have disappeared.

In order to obtain my improved pigment in the desired shade and strength, it now becomes necessary to effect the reversion or "cutting back" of the ferric oxide to an intermediate product consisting of part ferric and part ferrous oxide. This "cutting back" is most expeditiously and economically effected by the direct addition to the foregoing mixture of a solution of nine (9) parts of copperas in forty-two (42) parts of water. The iron sulphate which is added for the purpose of cutting back the mixture effects the precipitation of ferrous oxide and calcium sulphate as a result of the decomposition of some of the calcium carbonate previously precipitated in the mixture.

The foregoing process, it is believed, is represented by the following equations:

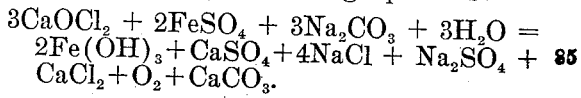

Cutting back formula:

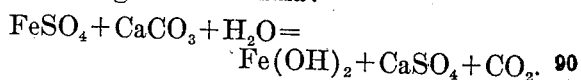

It is evident that calcium sulphate which, as indicated in the above formulæ, is formed upon the addition of the solution of bleaching powder to the ferrous sulphate solution, may be filtered off prior to the precipitation of the ferric hydroxide and thus the tinctorial strength of the resultant product will be correspondingly greater. For some purposes, however, the removal of the calcium sulphate is not only unnecessary but may even be inadvisable.

While I prefer to employ copperas, either in the crystalline form or in the condition known as pickle liquor from galvanizing works, owing to its availability at the present time, nevertheless other ferrous salts, such as ferrous chloride, may also be employed in my improved process with very satisfactory results.

In lieu of subjecting ferric salts prepared from ferrous salts, such as pickle liquor for example, to the reversion or "cutting back" operation, I may also perform this so-called cutting back operation upon ferric salts prepared from ferric oxide ($Fe_2O_3$), a cheap source of which is available as iron cinder or ore. When operating on such ferric salts it is necessary that a sufficient amount of a solution of an alkaline base, preferably sodium carbonate, be added to precipitate all of the iron ions contained in the ferrous salt used for the cutting back operation.

The application of this invention to insoluble ferric compounds, involving as it does a different species of the same generic invention, is claimed specifically in a copending application of even date herewith No. 597,182.

The ferrous oxide so precipitated, becomes homogeneously combined, both physically and chemically, with the entire mass of ferric hydroxide and as a consequence, as hereinafter stated, a product more uniform in strength and color is obtainable than can be accomplished were it attempted to secure such intermediate product by the partial or incomplete oxidation of the soluble ferrous salt in lieu of first carrying the oxidation to completion and then cutting back in the manner above described.

In those cases where ferrous chloride is used as the raw material operated upon, the resultant product will be relatively stronger tinctorially since soluble calcium chloride rather than insoluble calcium sulphate will be formed when the solution of bleaching powder is first added.

Among the several advantages of my process is the fact that, unlike those processes wherein the oxidation of iron hydrate is carried but partially to completion, the shade of the resultant product can be very accurately predetermined thru the control of the amount of the ferrous salt employed for the cutting back operation and consequently it is possible, as heretofore stated, to turn out successive batches of product each of practically the identical shade and strength. Unlike other processes of producing ferro-ferric oxides, the operation of my process and the control of the resultant product requires no highly skilled chemist for the purpose of making periodic quantitative analyses of the product as the oxidation progresses, as it is merely necessary for the operator to test with a test paper saturated with potassium ferri-cyanide for unoxidied ferrous salts in order to ascertain whether all ferrous iron has been oxidized. Thereafter, since the quantity of ferrous salt employed in the cutting back operation is predetermined, no quantitative analysis is required in the final stage of the operation, as mere tests with the aforesaid test papers will show when all of the ferrous sulphate added has been converted into ferrous hydroxide. Such accuracy of control is due largely to the fact that in my process the salt operated upon in the final or cutting back operation is a completely oxidized ferric hydroxide and not a partially oxidized iron hydroxide which is susceptible to further oxidation during the subsequent heating and drying stages in the process of treatment. Furthermore, my improved process will produce pigments of almost any desired shade of yellow, red, brown or black, which pigments, because of their extreme fineness, uniformity of color and permanency, are especially suited for use in printing inks, paints and like purposes wherein a pigment having such characteristics is adapted.

The precipitated iron hydroxide is filtered off, washed and then dried, preferably at a temperature of about 190° to 200° F. in the manner customary in drying such products. The finished product while undoubtedly containing some iron as hydroxide, the amount depending upon the temperature and time of drying, yet essentially it will consist of a ferro-ferric oxide.

The oxidizing agent which I preferably employ is bleaching powder ($CaOCl_2$) though other alkaline-earth oxychlorids or even oxygen, ozone or chlorine may be used in lieu thereof with satisfactory results. The heating of the mixture to effect the removal of the unutilized volatile bleaching agent may be accomplished before the precipitation of the ferric hydroxide by the alkaline base. The cutting back operation may also be undertaken before in lieu of after the precipitation of the ferric hydroxide but in such an event the residual volatile bleaching agent in the solution should be removed thru heating the mixture, as heretofore stated, prior to the addition of the ferrous salt used for such cutting back operation.

Without departing from the spirit of my invention, various modifications of the process herein described, within the scope of the appended claims, may be made.

If desired milk of lime can be advantageously employed in lieu of part or all of the sodium carbonate for the precipitation of the iron oxide, as obviously the amount of calcium sulphate precipitated will be limited by the quantity of ferrous sulphate present.

Having thus described my invention, what I claim and desire to secure by U. S. Letters Patent is:

1. The process of making iron oxide suitable for use as a pigment, which consists in precipitating ferric hydroxide from a solution of a soluble ferric salt by means of an alkaline compound including oxygen in its composition and then subjecting the resultant ferric hydroxide to the action of a soluble ferrous salt while in the presence of a sufficient quantity of an alkaline compound including oxygen in its composition to effect the precipitation, in the form of hydroxide, of substantially all of the iron ions from such soluble ferrous salt.

2. The process of making iron oxide capable of serving as a pigment, which consists in causing a mixture, comprising a ferrous salt, precipitated ferric hydroxide and an agent capable of precipitating iron from solutions of its mineral acid salts to react, the amount of such precipitating agent being sufficient to precipitate all of the iron ions from such ferrous salt in the form of hydroxide.

3. The process of making iron oxide capable of serving as a pigment, which consists in causing a mixture, comprising a ferrous salt, precipitated ferric hydroxide and an alkaline base to react, the amount of such alkaline base being sufficient to precipitate all of the iron ions from such ferrous salt in the form of hydroxide.

4. The process of making an iron oxide pigment of a predetermined tinctorial strength and shade which consists in first oxidizing a soluble iron salt beyond the stage of oxidation desired in the ultimate product, effecting the precipitation of ferric hydroxide from the resultant solution and then intimately mixing a soluble ferrous salt with the aforesaid resultant mixture and effecting the precipitation of the iron ions from such ferrous salt in intimate admixture and combination with such ferric hydroxide.

5. The process of making a ferro-ferric oxide suitable for pigment purposes, which consists in effecting the precipitation of ferric hydroxide from a solution of ferric sulphate and then adding ferrous sulphate solution to the aforesaid mixture while maintaining a sufficient quantity of an alkaline base in said mixture to substantially completely precipitate the iron ions from said ferrous compound.

6. The process of making iron oxide pigment which consists in oxidizing a solution of a soluble ferrous salt with a solution of an oxy-chloride compound of an alkali earth metal, rendering the solution sufficiently alkaline to effect the precipitation of the iron ions as ferric hydroxide and then adding a sufficient quantity of a ferrous salt to produce a ferro-ferric product of the desired shade and tinctorial strength while maintaining a sufficient quantity of an alkaline base in said mixture to substantially completely precipitate the iron ions from said ferrous compound.

7. The process of making ferro-ferric oxide of a predetermined tinctorial strength and shade, which consists in first oxidizing a soluble iron salt beyond the stage of oxidation desired in the ultimate product effecting the precipitation of ferric hydroxide in the mass, then adding a relatively small quantity of a ferrous salt and then effecting the precipitation of ferro-ferric oxide of the desired tinctorial strength and shade from the mixture.

8. The process of making ferro-ferric oxide which consists in effecting the precipitation of ferric hydroxide from a solution of a soluble iron salt and then mixing a soluble ferrous salt with such precipitated ferric compound in the presence of an agent capable of precipitating an iron compound from such ferrous salt.

Signed at New York city, in the county and State of New York this 24th day of October, 1922.

EARL H. McLEOD.